United States Patent [19]

Meginnis

[11] 4,245,769

[45] Jan. 20, 1981

[54] LAMINATE BONDING METHOD

[75] Inventor: George B. Meginnis, Indianapolis, Ind.

[73] Assignee: General Motors Corporation, Detroit, Mich.

[21] Appl. No.: 53,075

[22] Filed: Jun. 28, 1979

[51] Int. Cl.³ ............................................. B23K 31/02
[52] U.S. Cl. ............................ 228/173 B; 228/173 C; 228/193; 228/212; 228/243
[58] Field of Search ................ 228/141.1, 164, 173 R, 228/173 C, 173 B, 174, 193, 212, 243

[56] References Cited

U.S. PATENT DOCUMENTS

| 3,584,972 | 6/1971 | Bratkovich et al. ............... 29/191 X |
| 3,893,226 | 7/1975 | Waite .............................. 228/193 X |

Primary Examiner—Richard B. Lazarus
Attorney, Agent, or Firm—J. C. Evans

[57] ABSTRACT

A method for manufacturing a composite sheet of material having a controlled porous characteristic and made up of two or more metal lamina bonded together, including the steps of forming first and second sheets of porous material with a first and second array of openings therein offset with respect to one another; stacking the first and second sheets together to form a peripheral joint line therebetween having end edges indexed to align the first and second array of openings to form a coolant flow pattern through the stacked sheets; welding indexed end edges to fixedly connect the first and second sheets together; stretch-forming the stacked sheets by bending them under tension across a predetermined curvature on a form die to cause the first and second sheets to exceed their yield point to effect an intimate fit across juxtaposed surfaces thereon; thereafter further bending and restraining the welded end edges of the first and second sheets to produce a bond pressure between the sheets at the juxtaposed surfaces thereon and thereafter subjecting restrained and mechanically pressurized juxtaposed surfaces between the first and second sheets to an elevated bonding temperature for a predetermined period of time to produce a diffusion bonded metal joint between the stacked sheets.

3 Claims, 5 Drawing Figures

LAMINATE BONDING METHOD

This invention relates to a method for manufacturing laminated composite sheets of porous air cooled metal and more particularly to an improved means for preassembling laminated sheets to provide a diffusion bond between juxtaposed surfaces of one of a plurality of laminated porous metal sheets.

A sheet material of controlled porous characteristics made up of two or more metal laminae of the type set forth in U.S. Pat. No. 3,584,972, issued June 15, 1971, to Bratkovich et al, for LAMINATED POROUS METAL has been fabricated by a method that includes the steps of machining each of individual ones of plurality of sheets to provide fine pores, lands, grooves or other elements of surface relief thereon by techniques such as a photoetching machine process in which the raw sheet material is cleaned, masked by a suitable pattern, ordinarily by photographic techniques, and chemically or electrically etched to provide the desired surface relief and resultant air flow porosity through the individual sheets. Thereafter, the individual porous sheets are combined as a composite multi-laminae sheet which is clamped between two pressure plates located on opposite sides of the composite. Thereafter, the parts are subjected to suitable brazing or diffusion bonding techniques appropriate to the particular material of the layers to be joined together. In the use of high temperature alloys, processes of diffusion bonding have been found to be most suitable. In such arrangements, the sheets are cleaned and then lightly nickel plated prior to stacking and thereafter they are placed in either a clamp arrangmeent wherein clamp plates are located on each side and mechanically coupled together to apply unit loading to the parts to be joined. Alternatively, the stacked plates can be subjected to a dead weight loading or placed within an atmospheric pressure bag and then subjected to a diffusion bonding atmosphere at an elevated temperature and pressure which is maintained until the diffusion bond is created between the layers that are joined to each other. In such arrangements, the lands of the surface relief tend to aid in the diffusion bonding process by providing nucleation points across the planar extent of the flat surface plates to be joined together. Such arrangements place substantial loads on the surfaces to be joined. Moreover, the process fixtures have a substantial mass which must be heated to an elevated equilibrium temperature at which the diffusion process occurs.

An object of the present invention is to provide an improved method for joining individual sheets of a composite multi-laminae porous metal composite sheet wherein the need for deadweight loading or fixture load imposing plates of substantial mass and thermal sink properties are eliminated and wherein an improved loading of juxtaposed land surfaces of the sheets to be joined is obtained by the provision of a method which includes stacking first and second sheets to align a plurality of juxtaposed land surfaces on the sheets to be joined; thereafter aligning end edges of the sheets to index first and second arrays of openings in the sheets to form a cooling flow path therethrough; interconnecting the end edges to fixedly connect the first and second sheets together to hold the first and second arrays of holes in their indexed relationship; stretch-forming the stacked sheets by bending them under tension to cause the sheets to exceed their elastic limit thereby to force an outer one of the layered sheets into an inner sheet to effect an intimate fit across juxtaposed land surfaces thereon; and thereafter further bending the sheets and restraining the ends thereof by placing them in a low thermal mass restraint to engage edge portions of the first and second sheets to produce a mechanical bond pressure between the outer sheet and the inner sheet so as to hold the juxtaposed land surfaces thereof without imposition of direct mechanical loads on the outer surface of the stacked sheets and thereafter subjecting the sheets to an elevated bonding temperature and pressure diffusion bond cycle to produce a diffusion bond therebetween.

Another object of the present invention is to provide an improved method as set forth in the preceding object wherein the stacked sheets are bent over the curved surface of a form die and wherein an open-ended restraint fixture box of low thermal mass is engaged with only the interconnected end edges to maintain the stacked sheets in a bowed disposition thereby to maintain the mechanical bond pressure above set forth.

Further objects and advantages of the present invention will be apparent from the following description, reference being had to the accompanying drawings wherein a preferred embodiment of the present invention is clearly shown.

Figure 4:
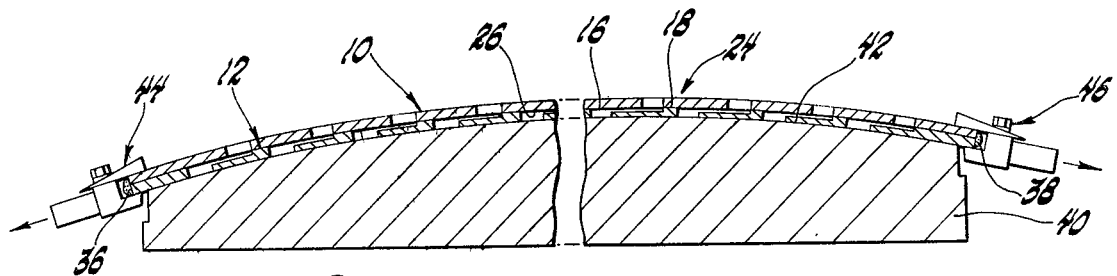
Figure 5:
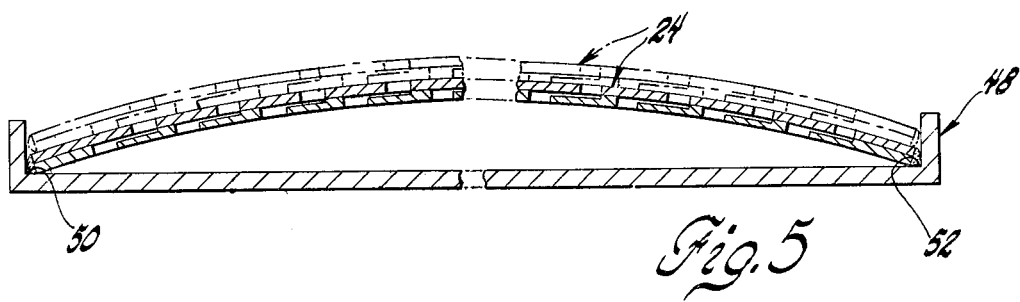

FIG. 4 is a diagrammatic view of a stretch forming step in the improved method wherein the two metal laminae are stretched beyond their elastic yield point over a semi-circular die to produce an intimate fit on juxtaposed land surfaces located at a joint surface between the two or more metal laminae of the composite sheet; and FIG. 5 is a view wherein the die formed stacked sheet material is further bent and restrained in an open ended fixture to produce a low bond pressure on facing surfaces between two or more metal laminae of a composite sheet of porous metal during a diffusion bond process wherein a molten phase occurs between the parts at land portions thereon to produce a diffusion bond connection of the two metal laminae making up the sheet material.

Figure 1:
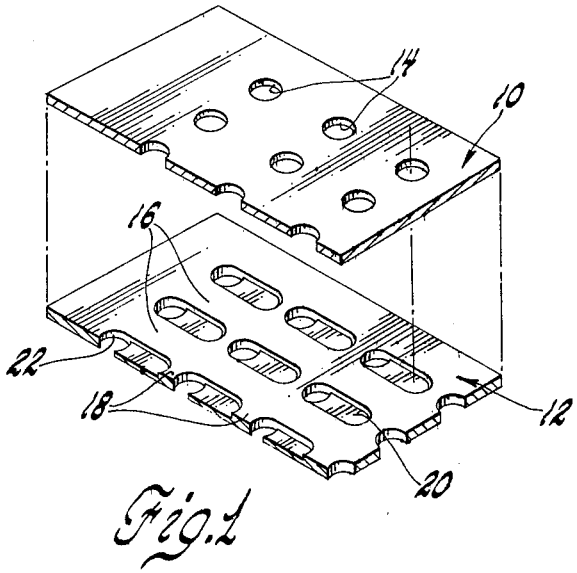
FIG. 1 is an exploded view of two metal laminae having first and second arrays of holes therebetween offset with one another to form a coolant air flow path between the sheets.
Figure 2:
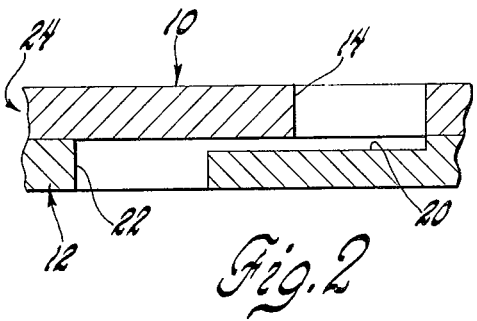
FIG. 2 is a fragmentary, enlarged vertical sectional view showing the two metal laminae of FIG. 1 stacked to form a composite sheet having a controlled porosity.
Figure 3:
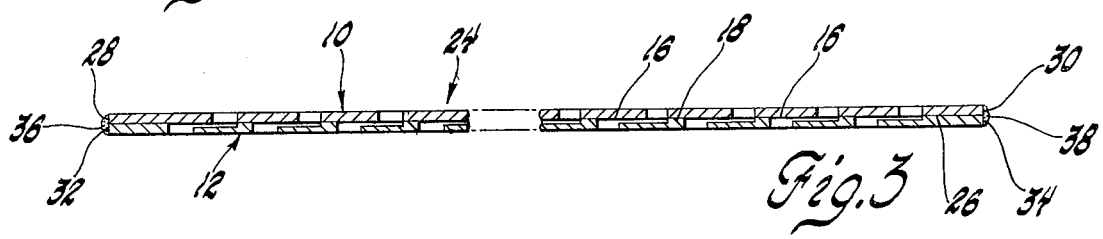
FIG. 3 is a cross-sectional view of the composite sheet welded together at its ends and in a prebonded condition.

Referring now to FIG. 1, a pair of laminae are illustrated in FIG. 1, preformed to comprise an outer lamina on sheet 10 generally exposed to a high temperature condition in an inner lamina or sheet 12. Both the lamina are of thin sheet metal from five to twenty mills in thickness. The outer lamina 10 has numerous small holes 14 of a diameter approximately equal to the thickness of lamina distributed more or less uniformly over its surface. The inner lamina 12 has an inner surface modified to provide distributed longitudinal bosses or ribs 16 and transverse ribs 18 to define a plurality of elongated flow control grooves 20 on the inner lamina 12 that intersect a plurality of small diameter holes 22 in the inner lamina 12 that are offset from the small diameter holes 14 in the outer lamina 10 as is best seen in FIG. 2. Combined, the small diameter holes 14, 22 and grooves 20 define a tortuous coolant air flow path to produce desired cooling of the material of a composite sheet 24 that is formed following a manufacturing sequence in accordance with the present invention. More particularly, when the sheets are aligned together as shown in FIGS. 2 and 3, the ribs 16, 18 are juxtaposed against an inner surface 26 of the outer lamina 10 to define a first plurality of diffusion bond regions thereon. Additionally, each of the transverse ribs 18 is located in juxtaposed engagement with the inner surface 26 of the outer lamina 10 to define further regions for bonding of the parts.

When the inner and outer laminae 10, 12 are initially stacked as shown in FIGS. 2 and 3, the inner surface 26 is in a flat plane as are the ribs 16, 18 of the inner lamina 12. Preferably the holes and grooves in the layers are produced by photoetching or electrochemical machining. The outer and inner laminae 10, 12 are aligned when stacked as shown in FIG. 2 so that the small diameter holes 14 and 22 are out of alignment with each other. The offset of the holes 14, 22 and the provision of the groove 20 therebetween when the parts are so aligned are such that air flowing through the stacked materials will strongly cool the surrounding metal of the stacked materials.

In the past, once the parts were stacked and aligned, several of the parts were placed in an assembly having bond stop-off separator sheets loaded along with a pressure bag between two heavy steel plates which were clamped together by wedge actuated retaining pins to load the juxtaposed bonding surfaces of the parts such as the contacting ribs 16 and 18 with the inner surface 26 of the outer lamina 10. In such an arrangement the loaded fixture was placed in a vacuum furnace with tubes through the furnace wall connecting the bag to an external nitrogen supply. A load pressure of just above 14.7 psi was applied through the pressure bag to the parts to be joined at a bonding step which maintained the parts at an elevated temperature in the order of 2050° F. for a time period of approximately four hours. Such an arrangement achieved an intimate contact between the sheets to be joined together and resulted in a high strength diffusion bond between the parts to be joined. Because of creep limitations of the materials from which the bonding fixture was made, large area pieces of porous metal composite material were difficult to bond together unless there were increases in both the fixture weight and the load imposed on the parts during the heating cycle. Such increases in both the fixture weight and load imposed thereby tend to cause difficulty in handling the fixtures; further, they require greater furnace hearth loads and heating-cooling times are greater. Moreover, substantial energy is required to bring such fixtures to an operating diffusion bond temperature level. Similar restrictions are also produced when the stacked parts are subjected to deadweight loading or hot press diffusion bond steps. Furthermore, bagged assemblies where the worked pieces are encapsulated and placed in a vacuum bag and then powered by atmospheric pressure are difficult to handle. Such bag steps require care in sealing the bag and tooling for such arrangements can be expensive.

Accordingly, in the present invention, a method sequence is utilized that meets the objective of maintaining the bond surfaces in intimate contact with one another without directing substantial unit loading against the exposed outer surfaces of the parts to be joined. More particularly, to accomplish this objective the parts are stacked together and indexed to offset the holes therein. Then, as shown in FIG. 3, the stacked laminae 10 and 12 are fixedly secured at opposite ends 28 and 30 of the outer lamina 10 and at opposite ends 32, 34 of the inner lamina 12. An edge weld 36 connects the aligned, indexed ends 28, 32. An opposite connection edge weld 38 joins the aligned indexed ends 30, 34.

The parts are then stretch formed over a die block 40 having a curved surface 42 thereon which serves as a guide. A tension load is directed to the composite sheet 24 by grip fixtures 44, 46 connected to the composite sheet at the edge welds 36, 38 thereof as best shown in FIG. 4. The grip fixtures 44, 46 apply a load to stretch the composite sheet 24 across the curved surface 42 until the material yields beyond its elastic limit. This produces an intimate fit at the bond surfaces between the inner surface 26 of the outer lamina 10 and the surfaces on the longitudinal ribs 16 and transverse ribs 18 that are in juxtaposed relationship therewith.

The tensioned, composite sheet 24 is then placed in an open ended restraint fixture 48 which has side corners 50, 52 therein in which are located the edge welded ends of the composite sheet 24 as best shown in FIG. 5.

The fixture is configured so that the composite sheet is bowed to a radius decreased from that of the curvature of the curved surface 42 thereby to provide a low level interlaminate load between the inner surface 26 and the juxtaposed surface areas of the longitudinal ribs 16 and transverse ribs 18. The low pressure between these points tends to hold the sheets together during the subsequent diffusion bonding cycle of operation. The low level pressure will be maintained at the surfaces up to a point at which the inner sheet would otherwise buckle or exceed its compressive or yield strength along the axis of the sheets. Accordingly, the pressure produced by the subsequent load producing bend in the composite plate as established by the restraint fixture 48 will suffice to maintain the parts together under a loading that will produce a sound diffusion bonded metalurigical joint between the outer lamina and the inner lamina when the facing surfaces are pre-cleaned and coated by a suitable bond material.

If desired, a molten phase bond accelerator can be placed on the bond surfaces as defined by the planar extent of the longitudinal ribs and transverse ribs 18 thereby to assure a molten metal phase during the diffusion bond process thereby to further assure a good metallurigical joint between the outer lamina and the inner lamina at the points thereon which are in juxtaposed relationship with one another.

The restraint fixture 48 is especially suitable for diffusion bonding of thin stock lamina used in sheet material having a controlled porous characteristic such as used to manufacture the component parts of gas turbine engines including nozzle vanes, turbine blades, and combustor components as well as air cooled shroud components. Several fixtures 48 can be stacked with several pieces 24 as shown in FIG. 5. Further, in assembly, multiples of several fixtures 48 can be stacked in the furnace during the diffusion bonding process.

Furthermore, the restraint fixture 48 is of low thermal mass and energy input to the process is thereby primarily used to diffuse and bond metal. The fixture configuration is of low mass and supports the composite sheet at edges only to extract little or no heat from the sheet so that energy of the diffusion bonding process can be for the most part substantially directed and maintained at the surfaces to be bonded.

Moreover, the configuration is such that the parts can be subjected to a hard vacuum merely by placing the fixture 48 and the composite sheet 24 therein within a vacuum furnace. Excellent vacuum furnace cleanliness is assured by the fixture configuration. Since the fixture mass can be very low, there is efficiency both in the cooling steps as well as heating steps of a thermal diffusion bond process.

In a typical diffusion bonding process the parts are placed in a low oxygen environment vacuum furnace which is maintained at a diffusion temperature of 2150° F. for a time period of approximately thirty minutes. Following the diffusion bonding step, the parts are cooled in a low oxygen environment to room temperature and have a resultant joint at juxtaposed surface areas of the longitudinal and transverse ribs 16, 18 to the inner surface 26 of the outer lamina 10.

For purposes of the present invention, some examples of high temperature alloys which are considered suitable for use in forming the porous material for use in practicing the method of the present invention and also suitable for extremely high temperature gas turbine engine service are set forth below.

| Name | AMS Spec. | Cr | Co | Mo | Ti | W | Al | Fe | Ni |
|---|---|---|---|---|---|---|---|---|---|
| Hastelloy X | 5,536 | 22 | 1.5 | 9.0 | ... | 0.6 | ... | 18.5 | Base |
| Waspaloy | 5,544 | 19.5 | 13.5 | 4.3 | 3.0 | ... | 1.4 | .... | " |
| René | 5,545 | 19 | 11 | 10 | 3.0 | ... | 1.5 | 5.0 | " |
| Udimet 500 | | 18 | 17 | 4 | 3 | ... | 3 | ... | " |
| Udimet 700 | | 15 | 8.5 | 5 | 3.4 | ... | 4.5 | ... | " |

Sheets of René 41, Hastelloy X and Waspaloy have been found to exhibit sufficient ductility for subsequent forming into turbine vanes and blades without seriously affecting the porosity of the sheet. Hastelloy X has been found suitable for use in combustion liners and exhaust duct parts.

It also should be pointed out that the several layers of the composite sheet 24 may be of the same composition. However, if not of the same composition, they can still practice the present invention as long as they have yeild characteristics which enable them to be processed in a step wherein they are first stretched beyond their yield point by the curved surface 42 to produce a first physical contact between the juxtaposed surfaces on the outer and inner laminae of the composite sheet. However, if they are not of the same composition, they should be of metals having compatible thermal expansion characteristics so that they are capable of being bonded together when placed in a restraint fixture 48 having the low heat mass characteristic of the present invention.

By virtue of the aforesaid arrangement a method of assembly is set forth which is energy efficient; easily handled and especially adaptable to conveyor type furnaces having an inert atmosphere such as nitrogen or argon wherein braze bonding will be most effectively performed.

While the embodiments of the present invention, as herein disclosed, constitute a preferred form, it is to be understood that other forms might be adopted.

The embodiments of the invention in which an exclusive property or privilege is claimed are defined as follows:

1. A method for fabricating a porous laminated structure comprising the steps of: forming a first sheet with a first determined array of openings therein, forming a second sheet with a second array of openings therein offset with respect to said first array of openings, stacking said first and second sheets together to form a joint line therebetween and to align end edges thereon as well as to align said first and second array of openings to form a coolant flow path through said stacked sheets having a portion thereof parallel to the joint line and a portion thereof perpendicular thereto, connecting said end edges to fixedly secure said first and second sheets together, stretch forming the stacked sheets under tension to cause the first and second sheets to exceed their elastic limit to effect an intimate fit along the mating surfaces at a joint line therebetween, and thereafter bowing the sheets and restraining the ends of the previously stretched material to produce a bond pressure between mating surfaces of the first and second sheets to hold such surfaces together at the joint line therebetween without imposition of direct mechanically imposed loads on the outer surfaces of the joint sheets and subjecting the restrained and pressure loaded surfaces to an elevated bonding temperature for a predetermined period of time without excessive dissipation of energy into the fixture while restraining the joined sheets as a diffusion bond occurs therebetween.

2. A method for fabricating a porous laminated structure comprising the steps of: forming a first sheet of metallic material with a first determined array of openings therein, forming a second sheet of metallic material with a second array of openings therein offset with respect to said first array of openings coating said first and second sheets with braze material at mateable bond surfaces thereon, stacking said first and second sheets together to form a joint line therebetween and to align end edges thereon as well as to align said first and second array of openings to form a coolant flow path through said stacked sheets having a portion thereof parallel to the joint line and a portion thereof perpendicular thereto, connecting said end edges to fixedly secure said first and second sheets together, stretch forming the stacked sheets under tension to cause the first and second sheets to exceed their elastic limit to effect an intimate fit along the mating surfaces at a joint line therebetween, and thereafter bowing the sheets and restraining the ends of the previously stretched material to produce a bond pressure between mating surfaces of the first and second sheets to hold such surfaces together at the joint line therebetween without imposition of direct mechanically imposed loads on the outer surfaces of the joined sheets, and subjecting the restrained and pressure loaded surfaces to an elevated bonding temperature for a predetermined period of time without excessive dissipation of energy into the fixture while restraining the joined sheets as a diffusion bond occurs therebetween.

3. A method for fabricating a porous laminated structure comprising the steps of: forming a first sheet of metallic material with a first determined array of openings therein, forming a second sheet of metallic material with a second array of openings therein offset with respect to said first array of openings, coating said first and second sheets with braze material at mateable bond surfaces thereon, stacking said first and second sheets together to form a joint line therebetween and to align end edges thereon as well as to align said first and second array of openings to form a coolant flow path through said stacked sheets having a portion thereof parallel to the joint line and a portion thereof perpendicular thereto, connecting said end edges to fixedly connect said first and second sheets together, stretch forming the stacked sheets by bending said sheets a predetermined amount along a predetermined curvature and pulling the ends of the sheets to cause the first and second sheets to exceed their elastic limit to effect an intimate fit along the mating surfaces at the joint line therebetween, and thereafter further bowing and restraining the ends of the previously stretched material by placing the previously bent sheets of material in an open ended fixture for engagement with edge portions of the first and second sheets to produce a bond pressure between mating surfaces of the first and second sheets to hold such surfaces together at the joint line therebetween without imposition of direct mechanically imposed loads on the outer surfaces of the joined sheets, and subjecting the restrained and pressure loaded surfaces to an elevated bonding temperature for a predetermined period of time without excessive dissipation of energy into the fixture while restraining the joined sheets as a diffusion bond occurs therebetween.

* * * * *